3,185,663
CYANOALKYL POLYSILOXANES
Maurice Prober, Schenectady, N.Y., assignor to General Electric Company, a corporation of New York
No Drawing. Filed Dec. 31, 1953, Ser. No. 401,701
12 Claims. (Cl. 260—46.5)

This invention relates to organosilicon compounds containing nitrile (—CN) radicals attached to silicon through aliphatic carbon. More particularly, this invention is concerned with linear and cyclic organopolysiloxanes containing at least one nitrile radical attached to an aliphatic carbon radical which in turn is attached to silicon through a silicon-carbon linkage.

The term "cyanoalkyl polysiloxanes" as used in this application refers to organosilicon compounds having a siloxane chain with at least one cyanoalkyl radical attached to silicon with the remaining valences of the silicon atoms, other than the valences which make up the siloxane chain, being satisfied by members of the class consisting of alkyl radicals, aryl radicals, aralkyl radicals, and alkaryl radicals.

The term "cyanoalkyl radical" refers to radicals of the formula:

(1)

where R is hydrogen or an alkyl radical, e.g., methyl, ethyl, propyl, butyl, etc., and $m$ is a whole number equal to from zero to 5, inclusive, and preferably is equal to from zero to 3, inclusive.

The cyanoalkyl polysiloxanes of the present invention include disiloxanes of the formula:

(2)
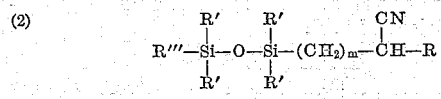

where R and $m$ are as defined above and the R''' radical and the various R' radicals are the same or different members selected from the class consisting of alkyl radicals as defined for R; aryl radicals, e.g., phenyl, naphthyl, diphenyl, etc., radicals; and

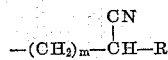

radicals, where R has the meaning given above. Preferably, only the R''' radical is the

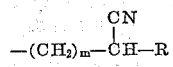

radical and the R' radicals are alkyl or aryl. Disiloxanes of the present invention include cyanomethylpentamethyldisiloxane,
cyanomethyldimethyltriethyldisiloxane,
bis-(cyanomethyl)-tetramethyldisiloxane,
β-cyanoethylpentaethyldisiloxane,
ω-cyanopropylpentapropyldisiloxane, etc.

Linear and cyclic organopolysiloxanes within the scope of the present invention contain the siloxane unit (3)
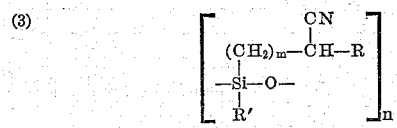

individually or recurring or intercondensed with siloxane units of the structure (4)

where R, R' and $m$ have the meanings given above, $n$ and $p$ are integers equal to at least 1, e.g., from 1 to 10 or more, and R'' is an alkyl or aryl radical of the class defined for R'.

Siloxane units of Formula 3 include, for example, cyanomethylmethylsiloxane,
cyanomethylphenylsiloxane,
β-cyanoethylethylsiloxane,
β-cyanopropylphenylsiloxane, etc.

Siloxane units of Formula 4 include, for example, dimethylsiloxane, diethylsiloxane, methylphenylsiloxane, etc.

Cyclopolysiloxanes which include the recurring unit of Formula 3 include sym-tetracyanomethyltetramethylcyclotetrasiloxane,
sym-tetracyanomethyltetraphenylcyclotetrasiloxane,
octacyanomethylcyclotetrasiloxane, etc.

Cyclopolysiloxanes containing the unit of Formula 3 intercondensed with the units of Formula 4 include, for example, cyanomethylpentamethylcyclotrisiloxane,
cyanoethylheptaethylcyclotetrasiloxane,
cyanomethyltetramethylpentaphenylcyclopentasiloxane,
cyanomethylheptamethylcyclotetrasiloxane, etc.

Liquid linear organopolysiloxanes within the scope of the present invention include those containing a plurality of siloxane units of Formula 3 condensed alone to form oils containing one or two silicon-bonded cyanoalkyl radicals per silicon. Also, included are liquid, linear organopolysiloxanes containing the siloxane units of both Formulas 3 and 4. By controlling the proportions of the two types of siloxane units, the ratio of cyanoalkyl radicals to silicon may vary within any desired limits. Thus, oils may be formed containing from two cyanoalkyl radicals per silicon atom to one cyanoalkyl radical per 100 or more silicon atoms. The linear polysiloxane of the present invention contain typical terminal groups such as the trimethylsilyl, triethylsilyl, triphenylsilyl, etc., radicals.

Also included within the scope of my invention are elastomers containing the intercondensed siloxane units of Formulas 3 and 4.

The cyanoalkyl organopolysiloxanes of the present invention may be prepared from chlorinated organopolysiloxane compounds which are well-known in the art. Many of these chlorinated organopolysiloxane compounds and their methods of preparation are described in the following patents: 2,435,148, McGregor et al.; 2,439,669, Nordlander; 2,444,858, Speier; 2,457,539, Elliott et al.; 2,491,833, Sauer; 2,507,316, McGregor et al.; 2,507,519, Goodwin, Jr.; 2,510,148, Speier; 2,513,924, Elliott et al.; 2,522,053, McGregor et al.; 2,589,446, Sommer. The chloroalkyl organosilicon compounds which may be used as starting materials in the present invention all contain the

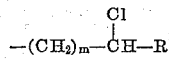

group where $m$ and R are as defined as above. The Grignard reagent of these chloroalkyl compounds is prepared in the usual fashion and added dropwise to a solution of cyanogen in diethyl ether. The Grignard addition of cyanogen to the polysiloxane takes place without the addition of any heat. Since cyanogen boils below —20° C., it is preferable to carry out the Grignard addition at temperatures below the point. Suitable temperatures for the reaction are from about —50° C. to about 0° C. The ratio of cyanogen to chloroalkyl radicals may vary within wide limits, e.g., from about 0.25 mole to 3.0 moles cyanogen per mole of cyanoalkyl radicals. However, we prefer to use about one mole of cyanogen per mole of chloroalkyl radical.

Silicone oils of the present invention containing cyanoalkyl radicals attached to silicon may be prepared in a number of ways. For example, oils may be prepared by equilibrating a cyanoalkylheptaalkylcyclotetrasiloxane with concentrated sulfuric acid in the presence of a suitable chain-stopper such as hexamethyl disiloxane. The chain length of the oil will depend on the ratio of cyclotetrasiloxane to chain-stopper. Oils may also be prepared by equilibrating a cyanoalkylheptaalkylcyclotetrasiloxane with both an octaalkylcyclotetrasiloxane and a chain-stopper. In this latter case the oil chain length will depend on the ratio of cyclotetrasiloxanes to chain-stopper and the ratio of silicon atoms to cyanoalkyl radicals will depend on the molar ratio of cyanoalkylheptaalkylcyclotetrasiloxane to octaalkylcyclotetrasiloxane and the chain-stopper. An oil having a ratio of silicon-to-cyanoalkyl radicals of 1:1 may be prepared by hydrolyzing methyl-β-cyanoethyldichlorosilane. The compound methyl-β-cyanoethyldichlorosilane is claimed and its method of preparation is described in copending application Serial No. 401,704, filed concurrently herewith and assigned to the same assignee as the present invention.

Elastomers within the scope of the present invention may be prepared by reacting a cyclopolysiloxane containing at least one cyanoalkyl radical attached directly to silicon with sulfuric acid to form a gum. This gum may be mixed with fillers and polymerization catalysts in the usual fashion to produce a cyanoalkyl silicone rubber.

The following examples are illustrative of the practice of my invention and are not intended for purposes of limitation.

EXAMPLE 1

Cyanomethylpentamethyldisiloxane was prepared by distilling 74.6 grams (1.43 moles) of cyanogen into 474 ml. of dry diethyl ether in a three-necked flask which was kept at about −55° C. The bath temperature was allowed to rise to between −40° C. and −50° C. and a solution of $(CH_3)_3SiOSi(CH_3)_2CH_2MgCl$ in 1700 ml. diethyl ether was added to the stirred cyanogen solution. The Grignard reagent was prepared by reacting 255.0 grams (1.30 moles) of chloromethylpentamethyldisiloxane and 30.6 grams (1.30 moles) of magnesium turnings. After the addition of the Grignard reagent was completed, the flask was allowed to warm to room temperature and the stirring was continued for about 16 additional hours. The reaction mixture was poured into a cold 10% ammonium chloride solution and the ether layer separated. This layer was dried over calcium chloride. Fractional distillation of the ether layer gave 18.2 grams of unreacted chloromethylpentamethyldisiloxane and 92.5 grams of cyanomethylpentamethyldisiloxane, boiling point 82–83° C. at 14 mm., refractive index $n_D^{20}$ 1.4118, density $d_4^{20}$ 0.875 and molar refractivity $MR_D$ 53.21 (calculated molar refractivity $MR_D$ 53.43). Analysis: 45.0% C, 9.3% H, 7.3% N. (Theoretical: 44.88% C, 9.15% H, 7.45% N.)

EXAMPLE 2

Cyanomethylheptamethylcyclotetrasiloxane was prepared by adding 15 ml. (14.3 grams, 0.274 mole) of cyanogen to 100 ml. of diethyl ether in a three-necked flask which was kept in a Dry Ice bath. The bath temperature was allowed to rise to −30° C. and a solution of the Grignard reagent of chloromethylheptamethylcyclotetrasiloxane in 400 ml. of diethyl ether was added to the stirred cyanogen solution. The Grignard reagent was prepared by reacting 82.6 grams (0.25 mole) of chloromethylheptamethylcyclotetrasiloxane with 6.1 grams (0.25 mole) of magnesium turnings. After the addition of the Grignard reagent was completed, the bath temperature was maintained at −30° C. for 3 hours and then allowed to rise to room temperature overnight. The ether solution was poured into cold 15% ammonium chloride and the ether layer separated. This ether layer was dried over calcium chloride and rectified. This rectification yielded 40.0 grams of cyanomethylheptamethylcyclotetrasiloxane, of which 11.3 grams boiled at 74.2 to 75.2° C. at 2.5 mm. and 28.7 grams boiled at 83.2 to 83.5° C. at 3.6 mm. The product had a refractive index $n_D^{20}$ 1.4159 and analysis showed it to contain 33.7% carbon, 7.2% hydrogen, and 4.6% nitrogen. (Theoretical: 33.7% carbon, 7.2% hydrogen and 4.4% nitrogen.)

EXAMPLE 3

1,3-bis-(cyanomethyl)-tetramethyldisiloxane was prepared by agitating 54.7 grams of cyanomethylpentamethyldisiloxane containing 0.1 grams of concentrated sulfuric acid for 20 hours at room temperature. The resulting siloxane was then shaken vigorously with water, dried and rectified. This rectification yielded 26.3 grams of cyanomethylpentamethyldisiloxane and 11.0 grams of 1,3-bis-(cyanomethyl)-tetramethyldisiloxane which had a boiling point of 97 to 99° C. at 0.1 mm. and a refractive index $n_D^{20}$ 1.4393. Analysis of this bis compound showed it to contain 44.8% carbon, 7.3% hydrogen and 13.4% nitrogen. (Theoretical: 45.23% carbon, 7.59% hydrogen and 13.19% nitrogen.)

EXAMPLE 4

An oil was prepared from cyanomethylheptamethylcyclotetrasiloxane by shaking 32.15 grams (0.100 mole) of the latter with 1.40 grams (0.00832 mole) of hexamethyldisiloxane and 1.2 ml. of concentrated sulfuric acid at room temperature for 24 hours. The solution was then shaken with water and an emulsion formed which was separated with the aid of benzene. The resulting benzene solution was washed with water until neutral, dried over calcium chloride and calcium carbonate, and the benzene was then removed. The residue was distilled at 2 mm. for 2 hours at 160 to 170° C., and filtered, leaving a clear oil which when subjected to infra-red analysis was shown to contain one cyanomethyl group for every 4.7 silicon atoms. This oil had a viscosity temperature coefficient of 0.71.

EXAMPLE 5

An oil was prepared by mixing 10.7 grams (0.0333 mole) of cyanomethylheptamethylcyclotetrasiloxane, 49.3 grams (0.166 mole) of octamethylcyclotetrasiloxane, 2.81 grams (0.0167 mole) of hexamethyldisiloxane, and 2.5 cc. of concentrated sulfuric acid. The mixture was shaken at room temperature for 24 hours and the resulting mixture was then shaken with water. Some gel that had formed was filtered off and the oil was then washed with water and dried over calcium chloride and calcium carbonate. After filtering the oil and removing the volatiles, it was found to contain forty silicon atoms per cyanomethyl group and had a viscosity-temperature coefficient of 0.61.

As shown by Table I below, the cyanomethyl oils of Examples 4 and 5 have viscosity-temperature coefficients which are slightly higher than the coefficient of a straight methyl silicone oil, but which are markedly lower than a hydrocarbon oil. The table also shows, in the lubricity column, that when cyanoalkyl radicals are introduced into a silicone oil the wear of steel on bronze is markedly reduced. In Table I the viscosity-temperature coefficient is measured as the fractional decrease in viscosity per degree change in temperature in the range from 100° F. to 210° F. Lubricity is measured as the wear scar in a Shell four ball tester which comprises a device for holding three rigidly clamped ½″ metal balls submerged in a lubricant in a metal cup. A fourth rotating ball of the same diameter is then pressed into contact with the three stationary balls by an adjustable loading arm and allowed to run for one hour. The contact points on the three stationary balls grow to circular scars as the wear progresses. The average diameter of these scars in millimeters after one hour's run at about 600 r.p.m., with about 10 kg. load, and with a rotating ball of steel and stationary bronze balls is taken as the measurement of wear. The cyanomethyl oils listed in the table are identified by the ratio of cyanomethyl radicals to silicon atoms and by the example in which the preparation of the oil is described.

*Table I*
PROPERTIES OF CYANOALKYL OILS

| Oil | Viscosity-temp. coefficient | Lubricity (wear scar, mm.), steel on bronze |
|---|---|---|
| —$CH_2CN/Si=1/4.7$ (Example 4) | 0.71 | 1.09 |
| —$CH_2CN/Si=1/40$ (Example 5) | 0.61 | 0.77 |
| Methyl silicone | 0.6 | 1.85 |
| Hydrocarbon oils | 0.9 | |

The following table (Table II) lists kinematic viscosity, density, and viscosity of the two cyanomethyl oils of Table I.

*Table II*
VISCOSITY DATA FOR CYANOMETHYL OILS

| Temp., °C. | | —$CH_2CN/Si=1/4.7$ (Example 4) | —$CH_2CN/Si=1/40$ (Example 5) |
|---|---|---|---|
| 37.8 | Kinematic viscosity, centistokes | 568.7 | 52.1 |
| | Density $d_4^{37.8}$ | 1.012 | 0.958 |
| | Viscosity, centipoises | 575.3 | 49.9 |
| 65.0 | Kinematic viscosity, centistokes | 306.5 | 33.0 |
| | Density $d_4^{65.0}$ | .990 | 0.935 |
| | Viscosity, centipoises | 303.5 | 30.9 |
| 98.9 | Kinematic viscosity, centistokes | 164.6 | 20.23 |
| | Density $d_4^{98.9}$ | 0.961 | 0.906 |
| | Viscosity, centipoises | 158.1 | 18.4 |

EXAMPLE 6

An oil was prepared by dissolving 47 grams of methyl-β-cyanoethyldichlorosilane in 350 ml. of diethyl ether and stirring for two hours with 50 grams of ice. This hydrolysis mixture separated into three phases, an oil layer, an aqueous phase and an ethereal phase. The oil layer was separated to give 26 grams of a clear, slightly yellow oil. This oil had a viscosity of 6800 centistokes at 25° C. and was insoluble in toluene, ethyl alcohol, hexane, and diethyl ether, but was readily soluble in dimethyl formamide. The oil was analyzed and found to contain 41.5% carbon, 5.9% hydrogen, and 13.1% nitrogen. (Theoretical: 42.5% carbon, 6.2% hydrogen, and 12.4% nitrogen.) This corresponds to a ratio of silicon to cyanoethyl radicals of about 1:1.

EXAMPLE 7

An oil was prepared by adding a solution of 387.0 grams (3.00 moles) of dimethyldichlorosilane, 81.4 grams (0.75 mole) of trimethylchlorosilane, and 81.0 grams (0.42 mole) of β-cyanoethyltrichlorosilane to 2 liters of water in 25 minutes and the mixture was stirred for an additional 2 hours. An emulsion formed and about 1000 ml. benzene was added to aid the separation. The benzene solution was washed with water several times, dried over calcium chloride, and the benzene was evaporated off. The oil was then filtered and devolatilized at 200 to 215° C. at 1.5 mm. for 2 hours. Analysis of this oil showed it to contain 3.05% nitrogen which corresponds to a ratio of about 5.9 silicon atoms per β-cyanoethyl radical.

EXAMPLE 8

A β-cyanoethyl silicone oil was prepared by the method of Example 7 using 387 grams (3.0 moles) of dimethyldichlorosilane, 27.1 grams (0.25 mole) of trimethylchlorosilane, and 18.5 grams (0.10 mole) of β-cyanoethyltrichlorosilane. Analysis of this compound showed it to contain about 14.3 silicon atoms per β-cyanoethyl radical.

EXAMPLE 9

A gum was prepared from cyanomethylheptamethylcyclotetrasiloxane by shaking 65.9 grams of cyanomethylheptamethylcyclotetrasiloxane and 0.36 gram of concentrated sulfuric acid at room temperature for 66 hours. Three grams of finely divided calcium carbonate and about 500 ml. benzene were mixed with the gum and the mixture was placed on milling rolls for 24 hours. At the end of this time a homogeneous solution was obtained. This solution was washed three times with water and dried over calcium sulfate. The benzene solution was centrifuged to remove a small amount of finely divided solid, and the solvent and volatiles were then removed by heating the solution at 90° C. Three 10-gram samples of the gum were compounded on small milling rolls. Sample No. 1 was loaded with 40 parts of finely divided silica aerogel (Santocel C) per 100 parts of gum and cured by electron beam radiation of $18 \times 10^6$ R. and oven-baked for 24 hours at 120° C. Sample No. 2 was loaded with 40 parts of silica aerogel per 100 parts of gum and cured with 3.3% benzoyl peroxide at 125° C. for 30 min. and oven-cured for 24 hours at 120° C. Sample No. 3 was loaded with 50 parts of carbon black per 100 parts of gum and cured by electron beam radiation of $6 \times 10^6$ R. and oven-cured for 24 hours at 145° C. These samples had tensile strength and percent elongations before rupture listed in Table III below.

*Table III*
PHYSICAL PROPERTIES OF CYANOMETHYL RUBBER

| Filler | Cure | Tensile strength (lb./in. 2) | Elongation, percent |
|---|---|---|---|
| Silica aerogel, 40 pts | Electron beam, $18 \times 10^6$ R. | 393 | 90 |
| Silica aerogel, 40 pts | Benzoyl peroxide, 3.3%. | 307 | 85 |
| Carbon Black, 50 pts | Electron beam, $6 \times 10^6$ R. | 431 | 100 |

The cyanomethyl rubbers of Example 9 were found to have solvent resistance superior to the solvent resistance of the usual methyl silicone rubber, as shown by Table IV below. Solvent resistance is indicated in Table IV as the percent gain in weight after a sample was immersed in the stipulated solvent for one week at room temperature.

*Table IV*
SOLVENT SWELLING

| Solvent | Cyanomethylsilicone rubber (wt. percent gain) | Methylsilicone rubber (wt. percent gain) |
|---|---|---|
| Methylcyclohexane | 20 | 135 |
| Gasoline | 18 | 120 |
| Aviation gasoline | 16 | 116 |
| Toluene | 66 | 119 |
| Carbon tetrachloride | 103 | 273 |

The cyanoalkyl polysiloxanes of the present invention are useful in applications where it is desirable to modify the properties of organopolysiloxane oils and gums. The cyanoalkyl disiloxanes are useful as chain-stoppers in siloxane oil formulations where it is desirable to have a polar group at the end of the oil chain. The cyanoalkyl silicone oils are valuable as lubricants and as hydraulic fluids. The cyanoalkyl silicone rubbers are valuable in coating operation and are particularly valuable when formed into gaskets which must come into contact with hydrocarbon solvents.

What I claim as new and desire to secure by Letters Patent of the United States is:

1. Disiloxanes having the formula:

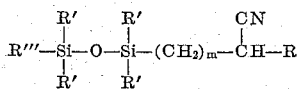

where R is a member selected from the class consisting of hydrogen and alkyl radicals; the various R' radicals are members selected from the class consisting of alkyl radicals and aryl radicals; R''' is a member selected from the class consisting of alkyl radicals, aryl radicals, and

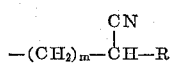

radicals; and $m$ is a whole number equal to from zero to 5, inclusive.

2. Organopolysiloxanes consisting essentially of the recurring structural unit

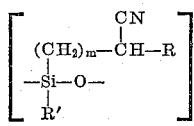

interchondensed with siloxane units of the structure

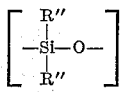

where R is a member selected from the class consisting of hydrogen and alkyl radicals; R' is a member selected from the class consisting of alkyl radicals and aryl radicals; the various R'' radicals are members selected from the class consisting of alkyl and aryl radicals and mixtures thereof; and $m$ is a whole number equal to from zero to 5, inclusive.

3. Linear organopolysiloxanes consisting essentially of the recurring structural unit

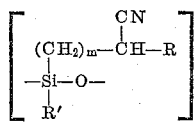

interchondensed with siloxane units of the structure

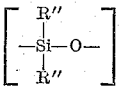

where R is a member selected from the class consisting of hydrogen and alkyl radicals; R' is a member selected from the class consisting of alkyl radicals and aryl radicals; the various R'' radicals are members selected from the class consisting of alkyl and aryl radicals and mixtures thereof; and $m$ is a whole number equal to from zero to 5, inclusive.

4. An organopolysiloxane elastomer consisting essentially of recurring methyl cyanomethyl siloxane units.

5. Organopolysiloxane oils consisting essentially of recurring methyl cyanomethyl siloxane units interchondensed with dimethyl siloxane units.

6. Organopolysiloxane oils consisting essentially of recurring methyl-β-cyanoethyl siloxane units.

7. Cyanomethylpentamethyldisiloxane.

8. Cyanomethylheptamethylcyclotetrasiloxane.

9. 1,3-bis-(cyanomethyl)-tetramethyldisiloxane.

10. An organopolysiloxane oil consisting essentially of interchondensed β-cyanoethyl siloxane units, dimethyl siloxane units, and trimethyl siloxane units.

11. A copolymeric siloxane consisting essentially of siloxane units of the formula

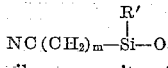

interchondensed with siloxane units of the formula

wherein $m$ is an integer from 2 to 4, inclusive, and R' is a member of the group consisting of alkyl and aryl radicals.

12. A siloxane of the unit formula

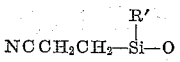

wherein R' is an alkyl radical.

References Cited by the Examiner
UNITED STATES PATENTS

| | | | |
|---|---|---|---|
| 2,557,803 | 6/51 | Sommer | 260—46.5 |
| 2,589,446 | 3/52 | Sommer | 260—46.5 |
| 2,657,226 | 10/53 | Frisch | 260—46.5 |
| 2,721,873 | 10/55 | MacKenzie et al. | 260—46.5 |
| 3,026,278 | 3/62 | Walton et al. | 260—18 |

FOREIGN PATENTS 1,116,725  2/56  France.

MURRAY TILLMAN, *Primary Examiner.*

W. G. BENGEL, MILTON STERMAN, P. MANGAN, A. M. BOETTCHER, *Examiners.*